April 2, 1968

H. L. RATLIFF, JR 3,376,381

WIDE-ANGLE STEREOSCOPIC RECORDING AND VIEWING APPARATUS
UTILIZING FISHEYE-TYPE DISTORTION
AND DIVERGING LENS AXES

Filed Jan. 15, 1964

PRIOR ART

INVENTOR
Harvey L. Ratliff Jr.

April 2, 1968  H. L. RATLIFF, JR  3,376,381
WIDE-ANGLE STEREOSCOPIC RECORDING AND VIEWING APPARATUS
UTILIZING FISHEYE-TYPE DISTORTION
AND DIVERGING LENS AXES
Filed Jan. 15, 1964  7 Sheets-Sheet 2

INVENTOR
Harvey L. Ratliff Jr.

April 2, 1968     H. L. RATLIFF, JR     3,376,381
WIDE-ANGLE STEREOSCOPIC RECORDING AND VIEWING APPARATUS
UTILIZING FISHEYE-TYPE DISTORTION
AND DIVERGING LENS AXES Filed Jan. 15, 1964     7 Sheets-Sheet 3

INVENTOR

Harvey L. Ratliff Jr.

INVENTOR
Harvey L. Ratliff Jr.

FIG. 8

INVENTOR
Harvey L. Ratliff Jr.

April 2, 1968  H. L. RATLIFF, JR  3,376,381
WIDE-ANGLE STEREOSCOPIC RECORDING AND VIEWING APPARATUS
UTILIZING FISHEYE-TYPE DISTORTION
AND DIVERGING LENS AXES
Filed Jan. 15, 1964  7 Sheets-Sheet 6

INVENTOR
Harvey L. Ratliff Jr.

FIG. 11

United States Patent Office 3,376,381
Patented Apr. 2, 1968

3,376,381
WIDE-ANGLE STEREOSCOPIC RECORDING AND VIEWING APPARATUS UTILIZING FISHEYE-TYPE DISTORTION AND DIVERGING LENS AXES
Harvey L. Ratliff, Jr., Amarillo, Tex., assignor of one hundred percent to Jefru Inc., Amarillo, Tex.
Filed Jan. 15, 1964, Ser. No. 337,878
5 Claims. (Cl. 178—6.5)

The present invention relates to a novel and improved system of stereo-scop-o-rama portrayals.

Objects and advantages of the invention will be set forth in part hereinafter and in part will be obvious herefrom, or may be learned by practice with the invention, the same being realized and attained by means of the process, steps and apparatus pointed out in the appended claims.

The invention consists in the novel process, steps and apparatus herein shown and described.

The accompanying drawings, referred to herein and constituting a part hereof illustrate embodiments of the invention, and together with the description, serve to explain the principles of the invention.

Figure 1A:
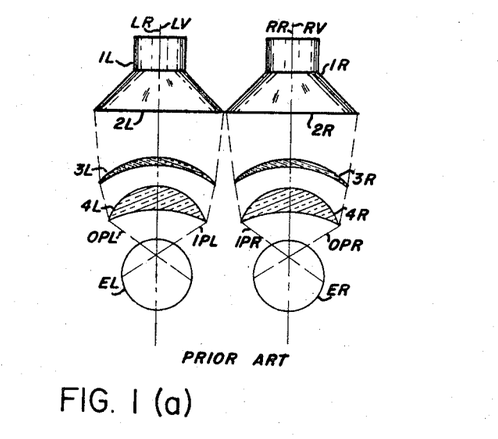
FIGURE 1(a) is a diagrammatic view which shows the basic principles used in the very recent prior art.

From the prior art it has been heretofore impossible to reproduce wide angle stereoscopic portrayals in motion which create the sensation of 180° peripheral vision for a viewing observer wearing spectacles. This is primarily because the right lens axis RR and the left lens axis LR of FIG. 1(a) are the same as the optical axes of the eyes of a viewing observer looking at the scene center, LV and RV in the prior art. Also the circle of vision allowed by eyepiece lenses 4L and 4R of the prior art shown in FIG. 1(a) has been limited as follows: first the optical axes of the eyes of a viewing observer looking at the scene center, LV and RV are the interpupillary distance apart of approximately 65 millimeters; therefore the right lens axis RR and the left lens axis LR are approximately 65 millimeters apart; therefore the limiting diameter of screens 2L and 2R is approximately 65 millimeters; so the diameter of lenses 3L and 3R must be substantially less than 65 millimeters say "60 millimeters"; and the diameter of lenses 4L and 4R must be substantially less than the diameter of lenses 3L and 3R say "55 millimeters." Therefore, the circle of vision of the prior art of FIG. 1(a) is limited to approximately 55 millimeters in diameter. This means, that the eye of a viewing observer must be approximately 10 millimeters away from the plane passing through the line of the peripheral edge of lens 4L or 4R, in order to have an angle of view as high as 140°.

Mathematical proof of this is as follows:

$$\tan 140°/2 = 55/2x$$
$$x = 27.5/\tan 70°$$
$$x = 10 \text{ millimeters}$$

It is virtually impossible for a person wearing spectacles to place his or her eye much closer to the plane of the peripheral edge of lens 4L or 4R than 19 mm. which is required for an angle of view of approximately 110°.

Figure 1B:
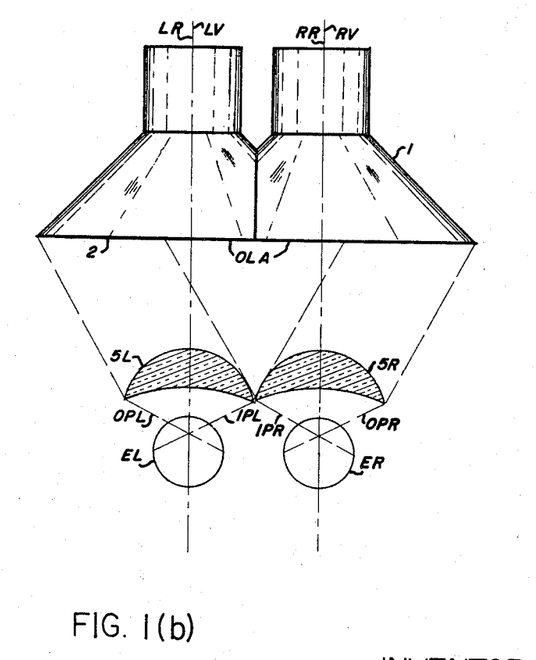
FIGURE 1(b) is a diagrammatic view which shows the basic principles used in my copending prior applications Ser. Nos. 275,411 (now abandoned), 250,562 (now U.S. Patent 3,293,358), and others each being filed in 1963.

In the inventions of my copending prior applications 275,411 (now abandoned), 250,562 (now U.S. Patent 3,293,358), U.S. Patent 3,272,069, and others each being filed within 1963, 1963, and 1965 respectively there was an overlapping area OLA of FIGURE 1(b), which made it possible to use single eyepiece lenses 5L and 5R; therefore the circle of vision allowed by lenses 5L and 5R could be as high as 65 millimeters if a portion is cut out for the nose. Obviously, if the circle of vision is 65 millimeters the angle of view would be greater if the eye of a viewing observer was 10 millimeters from the plane of the peripheral edge of lens 5L or 5R than it would if the circle of vision was only 55 millimeters as is the case with 4L or 4R.

Figure 2:
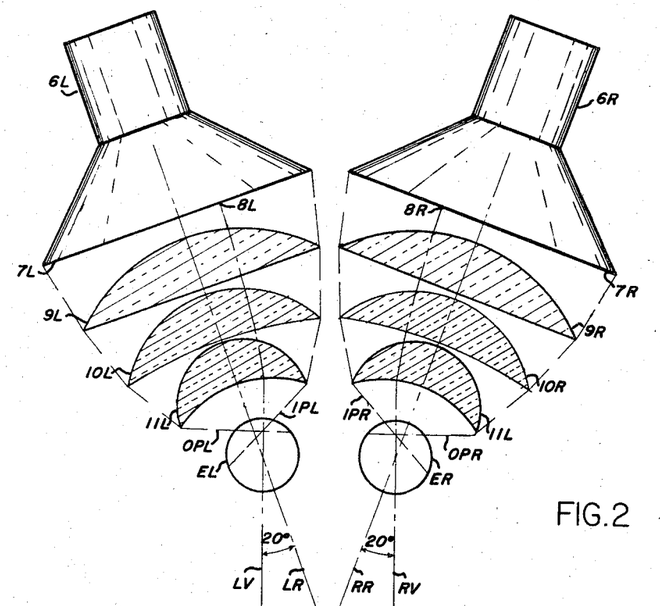
FIGURE 2 is a diagrammatic view which shows the basic distinguishing characteristics of the present invention from related prior inventions.
Figure 3:
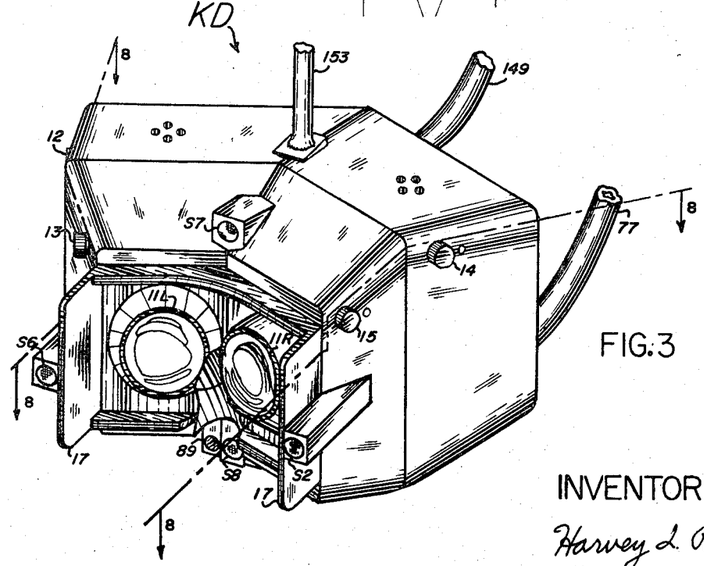
Figure 4:
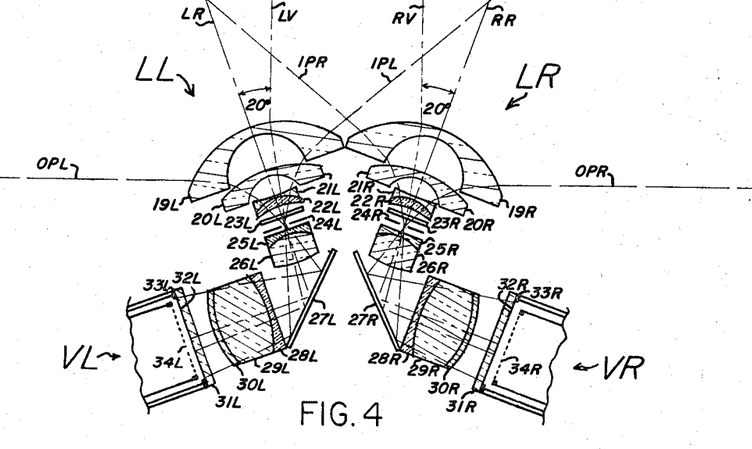
FIGURE 4 is a diagrammatic view which shows a contemplated recording system to be used in conjunction with the system of FIGURE 2.

The present invention is considered a substantial improvement over both FIGURE 1 (a) and FIGURE 1 (b). In the preferred contemplated form of the present invention shown in FIGURES 2, 3, 4, 5, 8, 9, and 10, the left eye view taking lens and ocular lens axis LR, of FIGS. 2 and 4, is rotated 20° to the left of and in the same horizontal plane with the left eye view optical axis LV as defined hereinabove; also the right eye view taking lens and ocular lens axis RR, of FIGS. 2 and 4 is rotated 20° to the right of and in the same horizontal plane with the right eye view optical axis RV as defined hereinabove. This accomplishes three important things. First, it makes it possible for the centers of the eye piece lenses (i.e. 11R and 11L) to be considerably further apart than 75 millimeters (i.e. some 86 millimeters) and for the remaining ocular lens centers to be much further apart than this (i.e. 104 mm. for 10L and 10R and 120 mm. for 9R and 9L) and therefore the non-broken circle of vision of eye piece lenses 11L and 11R to be greater than 75 millimeters in diameter. Second, the sensation of horizontal peripheral vision is made 40° more than it would otherwise be for any given circle of vision. Third, it makes it possible for a person wearing spectacles to place his or her eyes closer to the plane of the peripheral edge of the eyepiece lenses, because the distance between the temples (i.e. 127 mm.) of the spectacles is considerably less than the distance between the outside peripheral edges (i.e. 140 mm) of the eye piece lenses 11L and 11R, also the inside peripheral edges of eyepiece lenses 11L and 11R are considerably in front of the outside peripheral edges thereof, thus allowing the spectacles to be placed some 10 mm. in front of the outside edges of 11L and 11R to thereby enable the eye of the observer to be some 10 mm. closer to a much bigger ocular which creates some 40° more peripheral vision than the lens size and eye to lens distance ratio would allow without the diverging of lens axis LR from lens axis RR. These conditions are of course not true for the related prior inventions.

All these conditions, of the present invention, working together make it possible for a person with or without spectacles to have reproduced before him a right eye view which is 70° in every direction about axis RR, and to have reproduced before him a left eye view which is 70° in every direction about axis LR. This means that he or she can see approximately 90° to the right of RV, 50° to the left of RV, 70° above RV, and 70° below RV with his or her right eye and 90° to the left of LV, 50° to the right of LV, 70° below LV with his or her left eye.

Therefore the primary object of the present invention is to make practical the creation of 180° peripheral vision in the horizontal plane and 140° peripheral vision in the vertical plane for viewing observers wearing or not wearing spectacles.

There is prior art which teaches the recording and displaying of a multiplicity of separate right eye view images and a multiplicity of separate left eye view images to simulate wide angle stereoscopic still pictures. This system appears as a multiplicity of adjacent small windows rather than the uninterrupted wide angle view of the present invention. Further it would require a multiplicity of separate right and left eye view pick up tubes and kinescopic reproduction tubes in order to be used for motion reproduction, which of course has definite disadvantages.

It is another object of the present invention to overcome the problems of the prior art by the novel processes and apparatus of the present invention.

It is a further object of the present invention to teach an embodiment which will work in conjunction with the inventions of my prior applications Ser. Nos. 287,338 (now U.S. Patent 3,360,606) 295,792 (now U.S. Patent 3,291,904), and 291,198 (now U.S. Patent 3,358,078), each being filed within the year 1963.

It is still a further object of the present invention to teach an embodiment upon which the system for correcting for chromatic aberration, barrel distortion, and pin cushion distortion taught in my co-pending prior applications Ser. Nos. 275,411 (now abandoned) and 291,198 (now U.S. Patent 3,358,078), each being filed within the year 1963 may be used.

Other objects and advantages of my invention will become more apparent from a study of the following description taken with the accompanying drawings.

The essential two ingredients of the present invention are that first it involves a fisheye-type, compressed stereoscopic camera for introducing a predetermined amount of barrel distortion upon the recorded images, these images having a predetermined amount of barrel distortion are to be viewed through wide-angle expanding oculars which introduce a predetermined amount of pincushion distortion which will substantially nullify this barrel distortion so that the recreated stereo wide-angle scene is substantially distortionless on the one hand and second it involves the diverging of the lens axes with the associated wide-angle advantages on the other hand. These two essential ingredients have many "fall out" benefits such as those set forth in the "objects" hereinabove.

Referring more particularly now to FIGURES 4, 5, 10, and 11. Lens systems LL and LR may of course be any well known wide angle lens arrangement however it is contemplated that the basic "fisheye" type shown in FIGURE 4 will be used. Each lens system in the contemplated form of the invention has a collector lens system which is made up of large negative meniscus lenses 19L or 19R, and negative meniscus lenses 20L or 20R, a first achromatic lens system made up of lenses 21L and 22L or 21R and 22R filtering elements 23L or 23R, aperture 24L or 24R, a second achromatic lens system made up of lenses 25L and 26L or 25R and 26R, reflecting elements 27L or 27R, and a third achromatic lens system made up of lenses 28L, 29L and 30L or 28R, 29R and 30R as shown in FIGURE 4. It can be seen that the lens elements of LL and LR are substantially (within mechanical tolerances) coaxial with each other about an axis of symmetry and an optical axis.

The lens systems are arranged such that LV and RV shown in FIGURE 4 are approximately 65 millimeters apart, that LR is rotated 20° to the left of and in the same horizontal plane with LV and that RR is rotated 20° to the right of and in the same horizontal plane with RV. The focal length of LL and LR is made very short in the well known manner (for example 8 mm.).

All right eye view rays within a 140° cone as by way of example, defined by outside peripheral ray OPR and inside peripheral ray IPR and within 70° in every direction from taking lens and ocular lens axis RR pass through lens 19R, lens 20R, the first right achromatic lens system, filtering element 23R, aperture 24R, the second right achromatic lens system, are reflected by reflecting element 27R, pass through the third right achromatic lens system and are focused upon the target 32R (or equivalent image sensitive media) of simultaneous color pickup tube VR which may be any pickup tube described in my copending prior application Ser. No. 275,411, filed Apr. 24, 1963, now abandoned, or other equivalent image sensitive media. What is picked up by tube VR is recorded, as shown in FIGURE 11 at 79, on film and tape in manners well known in the art and monitored by the recording technician through the kinescopic optical viewing device KD of FIGURE 10, in which the video and optical portion is the same as that shown in the described for FIGURES 3, 8, and 9. What is picked up by tube VR may also be monitored by as many other people as desired as shown in FIGURE 11 through devices KD–1, KD–2, KD–3 etc. thereof which are each such as shown in FIGURE 3.

All left eye view rays within a 140° cone defined by outside peripheral ray OPL and inside peripheral ray IPL and within 70° in every direction from taking lens and ocular lens axis LR pass through lens 19L, lens 20L, the first left achromatic lens system filtering element 23L, aperture 24L, the second left achromatic lens system, are reflected by reflecting element 27L, pass through the third left achromatic lens system, and are focused upon the target 32L, (or equivalent image sensitive media) of simultaneous color pick up tube VL which may be any pick up tube described in my copending prior application Ser. No. 275,411, filed Apr. 24, 1963, now abandoned, or other equipment image sensitive media. What is picked up by tube VL is recorded, as shown in FIG. 11 at 79, on film and tape in manners well known in the art and monitored by the recording technician through the kinescopic optical viewing device KD of FIGURE 10, in which the video and optical portion is the same as that shown in and described for FIGURES 3, 8, and 9. What is picked up by tube VL may also be monitored by as many other people as desired as shown in FIGURE 11 through devices KD–1, KD–2, KD–3 etc. thereof which are each such as that shown in FIGURE 3.

It can be seen from observing FIG. 4 that negative meniscus lenses, i.e. 19R and 20R or 19L and 20L compress the rays within the cones represented by OPR and IPR from a wide angle disposition to a narrow angle disposition. This is, of course, because of the inherent truth that negative meniscus lenses compress the angular disposition of rays passing therethrough. It can also be seen from observing FIG. 4 that the positive lenses work therewith after the compression has taken place to focus the rays in the compressed form upon the flat surface, i.e. 32R or 32L. This is, of course, because of the inherent truth that the real images formed by positive lenses alone are neither compressed nor expanded significantly, for example, the spherically shaped real image formed on the retina of the eye (by its positive lens) is neither compressed nor expanded significantly nor is the flat image formed by the positive lens of an ordinary camera.

Therefore, as herein used, the term "compressing taking lens" means the fisheye-type (or "barrel distortion producing" type) of action which was characterized by the original "Hill fisheye" or by one of the more recent "fisheyes," i.e. "Nikon fisheye," and which falls within the conventional meaning of "compressed" as set forth in the following:

Willard D. Morgan et al. (General Editor), "Fisheye (Super-Wide-Angle) Cameras," The Encyclopedia of Photography, vol. 8, copyright MCMLXIII by the Greystone Press, p. 1491, column 1, lines 11 and 12.

The manner in which the video and optical portion of the kinescopic optical viewing device KD shown in FIGURES 3, 8, 9, and 10 works may be described by referring to FIGURE 2. The image picked up by recording apparatus VR is maintained on screen 7R by tube 6R (or by equivalent image maintaining apparatus) in manners well known to people skilled in the electronics or equivalent art. Rays of light leaving screen 7R are converged by lens 9R, further converged by lens 10R, and still further converged by positive meniscus lens 11R such that the rays of light appear to the right eye ER of the viewing observer to originate at points several feet therefrom. All the rays leaving 11R enter the right eye within a cone which is 70° in every direction about axis RR defined by OPR and IPR and having substantially the same corresponding relationship to axis RR they had when entering lens system LR. The ray which corresponded to optical axis RV of a viewing observer looking at the scene center in FIGURE 4 originates at scene center point 8R and enters the eye along axis RV of FIG. 2. The image picked up by recording apparatus VL is maintained on screen 7L by tube 6L (or by equivalent image maintaining apparatus) in manners well known to people skilled in the electronics or equivalent art. Rays of light leaving screen 7L are converged by lens 9L, further converged by lens 10L, and still further converged by positive meniscus lens 11L such that the rays of light appear to the left eye EL of the viewing observer to originate at points several feet therefrom. All the rays leaving 11L enter the left eye within a cone which is 70° in every direction about axis LR defined by OPL and IPL and having substantially the same corresponding relationship to axis LR they had when entering lens system LL. The ray which corresponded to optical axis LV of a viewing observer looking at the scene center in FIGURE 4 originates at scene center point 8L and enters the eye along axis LV of FIGURE 2.

To put it another way, as is clearly shown in FIG. 2, positive lenses 9R, 10R and 11R or 9L, 10L and 11L expand the angular disposition of the rays originating upon screen 7R from the compressed disposition back into the expanded disposition of which they entered taking lenses LR and LL. This is, of course, because of the inherent truth that positive lenses, when used as oculars, present the virtual image of a wide object in a greatly expanded form.

Therefore, as herein used, the term "expanding ocular lens" has the "reverse" of this "fisheye" (or in other words "pincushion distortion producing") type action, where the term "reverse" is used in the conventional sense as set forth in the following:

Van Albada, col. L.E.W., "A Wide-Angle Stereoscope and a Wide-Angle View-Finder," Transactions of the Optical Society of London, vol. 25, 1923-24, pp. 252, last few lines, and 253, first few lines.

Of course, the "landscape or meniscus lens with the stop in front" of Van Albada is also a "compressing taking lens," but it has the astigmatic difficulties pointed out by Van Albada, which are overcome by using the "fisheye-type" compressing lens. Also, of course, the size of the "fisheye-type" images must be enlarged or adjusted as can be seen by comparing FIGS. 2 and 4 whereby the rays enter the eyes ER and EL substantially as they entered the taking lenses LR and LL or in other words such that the "pincushion distortion" introduced by the oculars, 62R and 62L, substantially nullifies the "barrel distortion" of the "fisheye-type" images. Obviously, the taking lenses and the ocular lenses could be precisely matched to eliminate this distortion, but it is usually easier to match the sizes of the images rather than the lenses.

Figure 5:
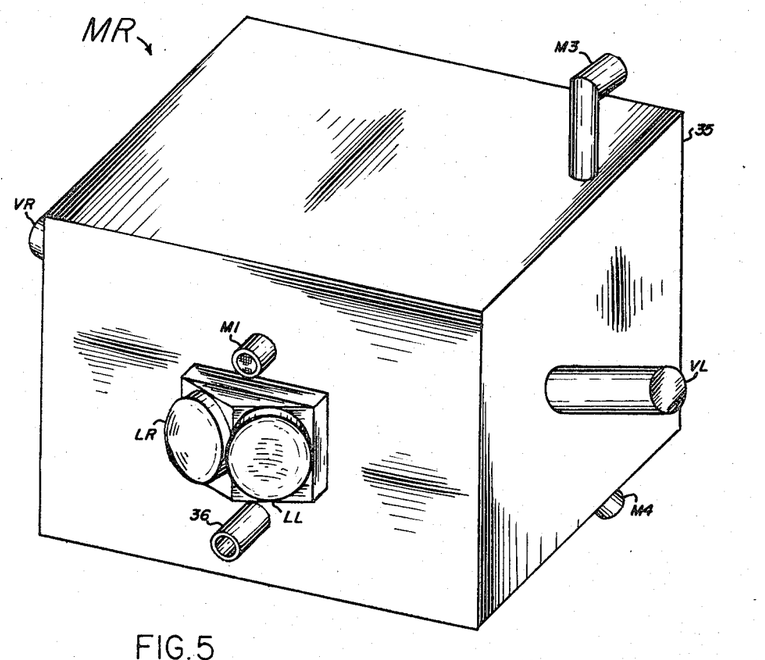
FIGURE 5 is an isometric drawing showing a contemplated embodiment of a recording apparatus for the present invention.
Figure 10:
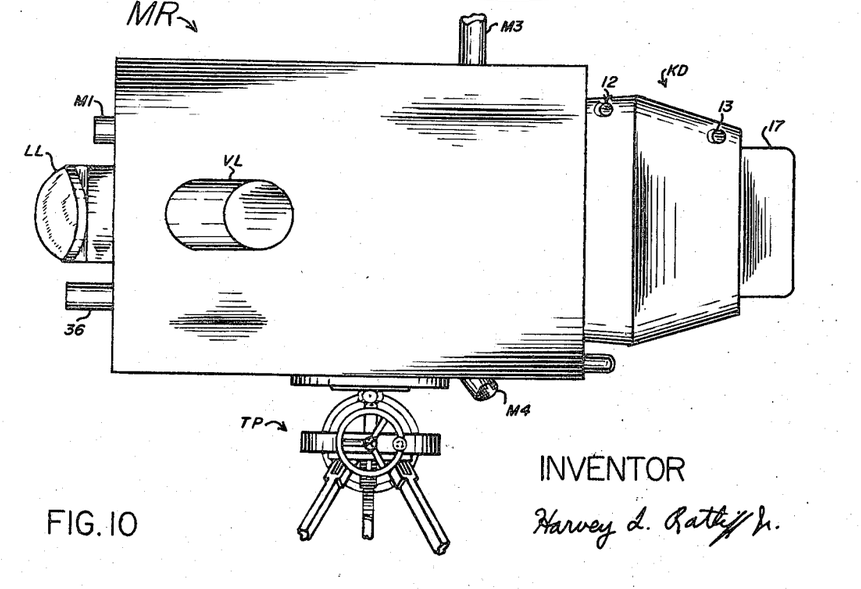
FIGURE 10 is a side view of the embodiment of FIGURE 5.
Figure 11:
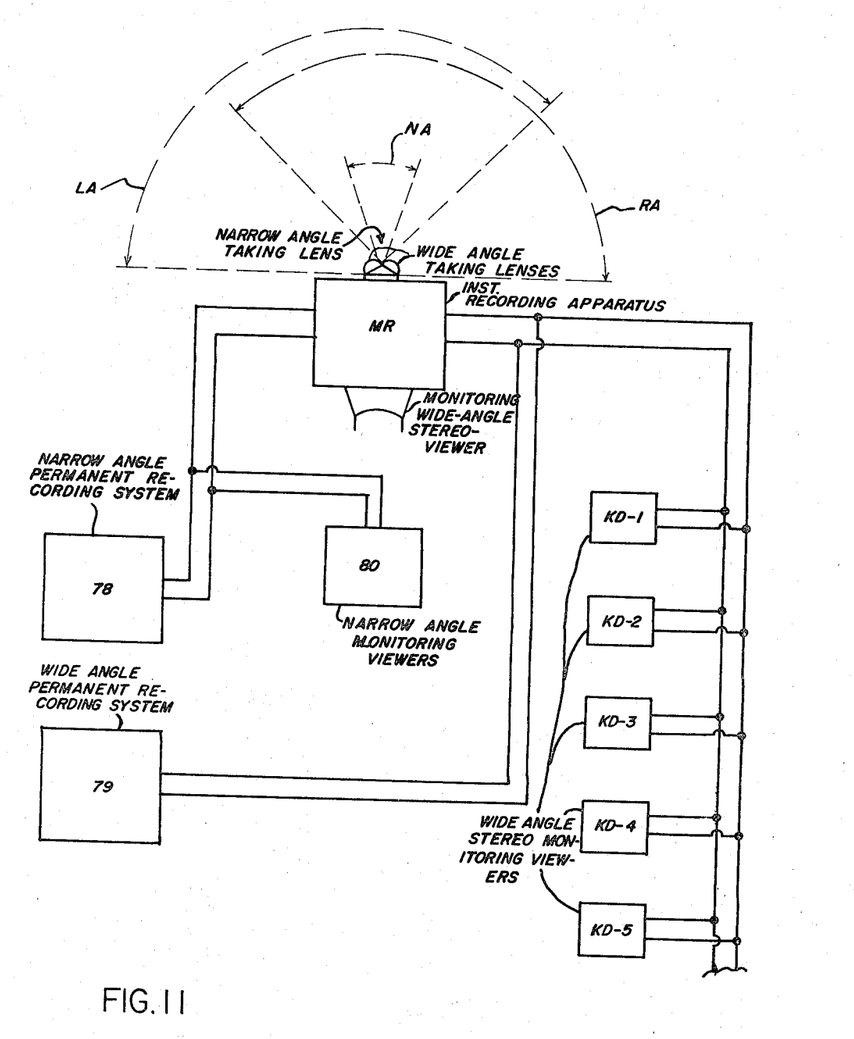
FIGURE 11 is a diagrammatic view designed to show the overall recording procedure.

Microphones M1, M2, M3, and M4 of FIGS. 5 and 10 of the present invention function as described in the description of FIGURES 1–8 of my copending prior application Ser. No. 287,338, filed June 12, 1963, now U.S. Patent 3,360,606. It is contemplated that the viewers such as that shown in FIG. 3 of the present invention will be used in conjunction with one of the stereophonic reproduction systems of said application 287,338, (now U.S. Patent 3,360,606). It is preferred that speakers S2, S6, S7, and S8 function as described in the description of FIGURES 12, 13(a), 14(a), 16, 16(a), and 17 of said application 287,338 Patent 3,360,606.)

Each viewer such as that shown in FIG. 3 of the present invention is supported by element 153 and the other elements shown in FIGURE 14 of said application 287,338, (Patent 3,360,606) in the manner described therein. Also TP of FIG. 10 hereof functions as described in said 275,411.

It is also preferred that the viewers such as the one shown in FIGURE 3 of the present invention are designed to be used in conjunction with the sound, odor, temperature, wind direction and velocity, and sunshine simulation systems of my co-pending prior application Ser. No. 295,792, filed July 17, 1963, now U.S. Patent 3,291,904. Conduit 149 brings the video and audio signals to the viewer which have been recorded on recording media to appear as described in said 295,792 (Patent 3,291,904), said signals being recorded as shown in FIGURES 4, 5, 10, and 11 hereof; hose 77 brings in the temperature controlled perfumed air which is emitted out of ports 89 as described in said 295,792 (Patent 3,291,904). In other words the KD sets and pick up and recording apparatus of FIGURES 5, 10, and 11 of the present invention are substituted for the KD sets of FIG. 4 of said 295,792 (Patent 3,291,904) and its corresponding pick up and recording apparatus, but everything else works as described in said 295,792 (Patent 3,291,904).

Referring more particularly to FIGURE 11, the wide angle right and left eye views RA and LA respectively are focused on the proper pick up tubes as described hereinabove in the description of FIGURE 4 herein. The signals from these pick up tubes are applied to recording system 79 which records them on both magnetic tape and film in well known manners as diagrammatically indicated in FIGURE 11; these signals are also applied to several viewers such as KD–1, KD–2, KD–3, KD–4, and KD–5 which are each like the viewer shown in FIGURES 3, 8, and 9 herein; these signals are also applied to the viewer secured to the rear of MR shown in FIGURE 10 hereof at KD. The recording technician monitors exactly what is being recorded by MR through the viewer shown in FIGURE 10 and as many other people as desired may monitor exactly what is being recorded by MR through viewers such as KD–1, KD–2, KD–3, KD–4, and KD–5 diagrammatically shown in FIGURE 11. Narrow angle lens 36 of FIGURE 10 focuses the narrow angle nonstereoscopic view NA of FIGURE 11 upon the target of a third simultaneous color pick up tube which basically functions in the same well known manner as the tube VL or VR of FIGURE 4 hereof. The signals from this third tube are applied to recording system 78 which records them on both magnetic tape and film in well known manners as diagrammatically illustrated in FIGURE 11 hereof; these signals may be monitored by a well known monitoring system 80 of FIGURE 11.

Figure 8:
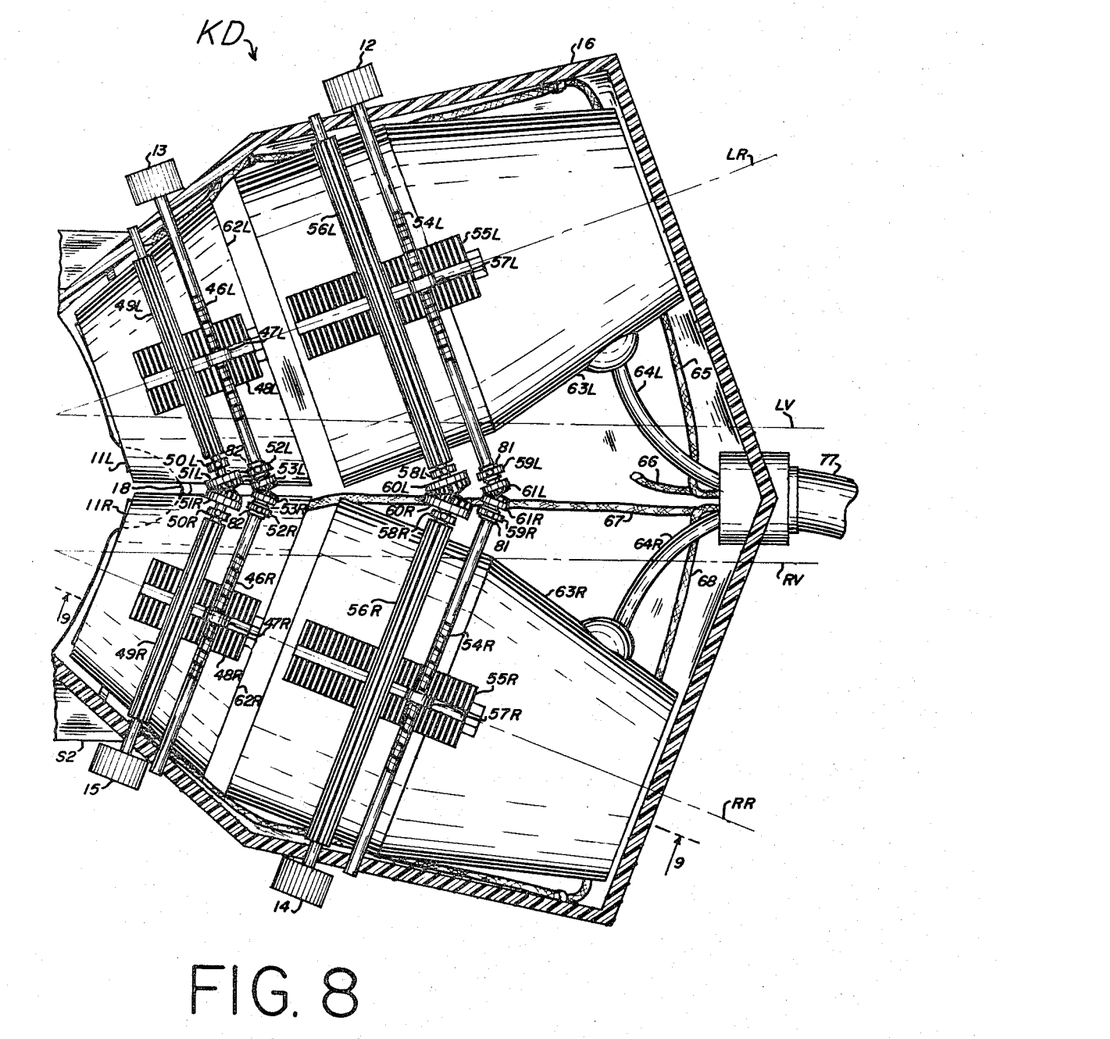
FIGURE 8 is a sectional view of the embodiment of FIGURE 3 taken along 8—8 of FIG. 3 looking in the direction of the arrows.
Figure 9:
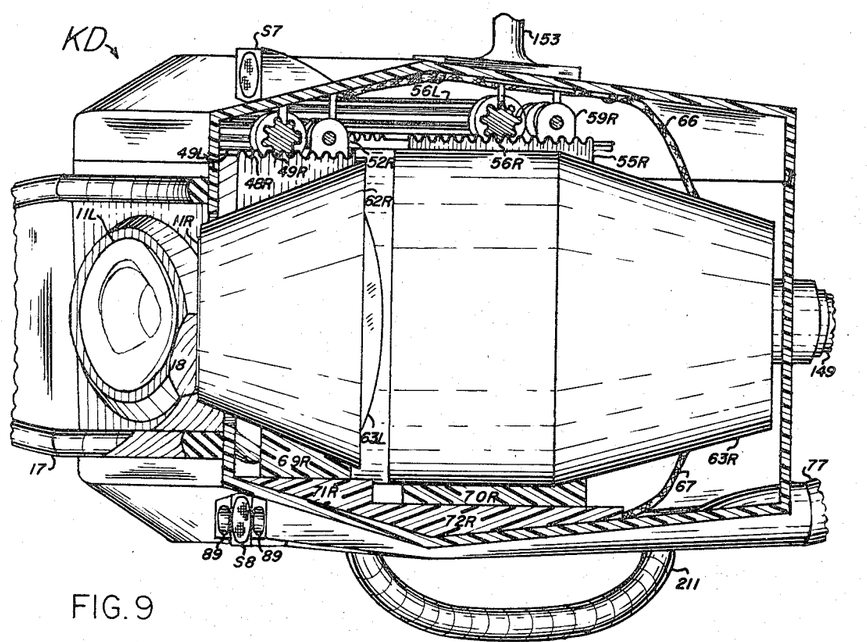
FIGURE 9 is a sectional view of the embodiment of FIGURE 3 taken along 9—9 of FIGURE 8 looking in the direction of the arrows.

After the RA and LA signals (see FIG. 11) are recorded, they may be reproduced and monitored as many times as desired in an auditorium such as that described in said 295,792 (Patent 3,291,904) through viewers such as shown in FIGURES 3, 8, and 9 herein, by as many people as desired. The NA signals recorded on tape and film may be shown on commercial television or in conventional motion picture theaters.

Referring more particularly to FIGURES 3, 8, and 9, it may be seen by observing FIGS. 8 and 9 that the optical units 62R and 62L and the kinescopic units 63R and 63L may be made selectively adjustable relative to each other. Knob 14 is made rigidly secured to the right outside bearing of element 56R. The outside bearing of element 56R is rotatably supported by casing 16 and the inside bearing of element 56R is rotatably supported by element 58R which is supported by the roof of casing 16. The teeth of element 56R mesh with the teeth of element 55R. Bevel gear element 60R is rigidly secured to the inside bearing of 56R. The teeth of bevel gear element 60R mesh with the teeth of bevel gear element 60L which is rigidly secured to the inside bearing of element 56L. The inside bearing of element 56L is rotatably supported by element 58L which is supported by the roof of casing 16. The outside bearing of element 56L is rotatably supported by casing 16. The teeth of element 56L mesh with the teeth of element 55L. Elements 70R and 72R work together to make kinescopic unit 63R movable only along axis RR or perpendicular thereto. Elements 70L and 72L which are not shown but which function in the same manner as elements 70R and 72R to work together to make kinescopic unit 63L movable only along axis LR or perpendicular thereto in the same plane as unit 63R.

Knob 12 is made rigidly secured to the outside bearing of element 54L which is rotatably supported by casing 16. Right handed threads upon the central portion of element 54L are made to engage in the right handed threads of stud 57L which while working in conjunction with 70L and 72L is capable of forcing kinescopic unit 63L to move perpendicular to axis LR while allowing 63L to be moved along axis LR by element 56L working in conjunction with elements 55L, 70L, and 72L, by sliding within the groove of element 55L. The inside bearing of element 54L is rotatably supported by element 59L which is supported by the roof of casing 16. Shoulders 81 are provided to hold element 54L from lateral movement. Bevel gear element 61L is rigidly secured to the inside bearing of element 54L. The teeth of bevel gear element 61L mesh with the teeth of bevel gear element 61R which is rigidly secured to the inside bearing of element 54R. The inside bearing of element 54R is rotatably supported by element 59R which is supported by the roof of casing 16. Shoulders 81 are provided to hold element 54R from lateral movement. Left handed threads upon the central portion of element 54R are made to engage in the left handed threads of stud 57R which while working in conjunction with 70R and 72R is capable of forcing kinescopic unit 63R to move perpendicular to axis RR while allowing 63R to be moved along axis RR by element 56R working in conjunction with elements 55R, 70R, and 72R, by sliding within the groove of element 55R. The outside bearing of element 54R is rotatably supported by casing 16.

It may now be seen that when knob 14 is rotated clockwise as seen from the right, kinescopic units 63L and 63R are moved along their respective axis closer to the eyes of a viewing observer viewing therein, and when knob 14 is rotated counter-clockwise as seen from the right, kinescopic units 63L and 63R are moved along their respective axis away from the eyes of a viewing observer viewing therein. It may also be seen that when knob 12 is rotated clockwise as seen from the left, elements 57L and 57R are moved outwardly thereby working in conjunction with 70L, 70R, 72L, and 72R to move kinescopic units 63L and 63R outwardly, perpendicular to their respective axis; and when knob 12 is rotated counter-clockwise as seen from the left, elements 57L and 57R are moved inwardly thereby working in conjunction with 70L, 70R, 72L, and 72R to move kinescopic units 63L and 63R inwardly, perpendicular to their respective axis.

Knob 15 is made rigidly secured to the right outside bearing of element 4R. The outside bearing of element 49R is rotatably supported by casing 16 and the inside bearing of element 49R is rotatably supported by element 50R which is supported by the roof of casing 16. The teeth of element 49R mesh with the teeth of element 48R. Bevel gear element 51R is rigidly secured to the inside bearing of 49R. The teeth of bevel gear element 51R mesh with the teeth of bevel gear element 51L which is rigidly secured to the inside bearing of element 49L. The inside bearing of element 49L is rotatably supported by element 50L which is supported by the roof of casing 16. The outside bearing of element 49L is rotatably supported by casing 16. The teeth of element 49L mesh with the teeth of element 48L. Elements 69R and 71R work together to make optical unit 62R movable only along axis RR or perpendicular thereto. Elements 69L and 71L which are not shown but which function in the same manner as elements 69R and 71R to work together to make optical unit 62L movable only along axis LR or perpendicular thereto in the same plane as unit 62R.

Knob 13 is made rigidly secured to the outside bearing of element 46L which is rotatably supported by casing 16. Right handed threads upon the central portion of element 46L are made to engage in the right handed threads of stud 47L which while working in conjunction with 69L and 71L is capable of forcing optical unit 62L to move perpendicular to axis LR while allowing 62L to be moved along axis LR by element 49L working in conjunction with elements 48L, 69L, 71L, by sliding in the groove of element 48L. The inside bearing of element 46L is rotatably supported by element 52L which is supported by the roof of casing 16. Shoulders 82 are provided to hold element 46L from lateral movement. Bevel gear element 53L is rigidly secured to the inside bearing of element 46L. The teeth of bevel gear element 53L mesh with the teeth of bevel gear element 53R which is rigidly secured to the inside bearing of element 46R. The inside bearing of element 46R is rotatably supported by element 52R which is supported by the roof of casing 16. Shoulders 82 are provided to hold element 46R from lateral movement. Left handed threads upon the central portion of element 46R are made to engage in the left handed threads of stud 47R which while working in conjunction with 69R and 71R is capable of forcing optical unit 62R to move perpendicular to axis RR while allowing 62R to be moved along axis RR by element 49R working in conjunction with element 48R, 69R, and 71R, by sliding within the groove of element 48R. The outside bearing of element 46R is rotatably supported by casing 16.

It may now be seen that when knob 15 is rotated clockwise as seen from the right, optical units 62L and 62R are moved along their respective axis (it is noted that the lens elements therein are substantially, within mechanical tolerances, coaxial) closer to the eyes of a viewing observer viewing therein, and when knob 15 is rotated counter-clockwise as seen from the right, optical units 62L and 62R are moved along their respective axis (it is noted that the lens element therein are substantially, i.e., within mechanical tolerances, coaxial) away from the eyes of a viewing observer viewing therein. It may also be seen that when knob 13 is rotated clockwise as seen from the left, elements 47L and 47R are moved outwardly thereby working in conjunction with 69L, 69R, 71L, and 71R to move optical units 62L and 62R outwardly perpendicular to their respective axis, and when knob 13 is rotated counter-clockwise as seen from the left, elements 47L and 47R are moved inwardly thereby working in conjunction with 69L, 69R, 71L, and 71R to move optical units 62L and 62R inwardly, perpendicular to their respective axis.

It may also be seen from observing FIGURES 8 and 9 that conduit 64L carries the video signals to kinescopic unit 63L, conduit 64R carries the video signals to kinescopic unit 63R, wires 68 carry the audio signal to S2, wires 65 carry the audio signal to S6, wires 67 carry the audio signal to S8, and wires 66 carry the audio signal to S7. It may also be seen from FIGURE 9 that the perfumed air blown out ports 89 is immediately adjacent the nose of a viewing observer viewing into KD.

Figure 6:
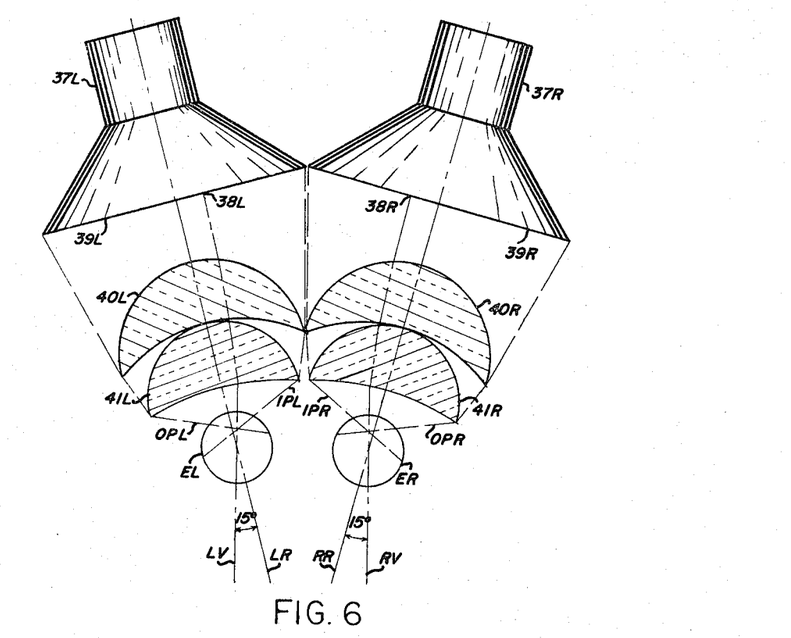
FIGURES 6 and 7 are diagrammatic views showing modified versions of the present invention.
Figure 7:
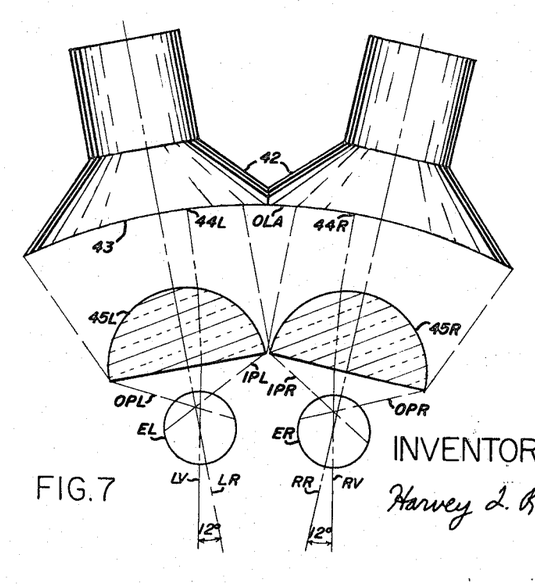

The angle between RR and RV and the angle between LR and LV may of course be more or less than 20° without departing from the spirit and scope of the present invention; however two other conditions are contemplated as shown in FIGURES 6 and 7. The first condition is shown in FIGURE 6. The system of FIGURE 6 would function exactly like the system of FIGURES 2 and 4 except for the following: the left eye view taking lens and ocular lens axis LR is rotated only 15° to the left of the left eye optical axis LV of a viewing observer looking at the scene center, the right eye view taking lens and ocular lens axis RR is rotated only 15° to the right of the right eye optical axis RV of a viewing observer looking at the scene center, there are only two right eye view lenses 40R and 41R, and there are only two left eye view lenses 40L and 41L. Elements 37L, 37R, 38L, 38R, 39L, and 39R function in a manner obvious from the description of elements 6L, 6R, 8L, 8R, 7L, and 7R respectively in the description of FIGURE 2 hereof. The only difference in the recording system would be the difference in the angle between LV and LR and between RV and RR.

The system of FIGURE 7 would function exactly as the system of FIGURES 2 and 4 except for the following: the left eye view taking lens and ocular lens axis LR is rotated only 12° to the left of the left eye view viewing axis LV, there is only one left eye view lens 45L, there is only one right eye view lens 45R, there is only one kinescopic unit 42, there is a single cylindrically shaped screen 43, and there is an overlapping area OLA which functions in a manner obvious from the description of my copending prior applications Ser. Nos. 275,411 (now abandoned) and 250,562 (now U.S. Patent 3,293,258), filed Apr. 24, 1963, and Jan. 10, 1963, respectively. Elements 44L and 44R function in a manner obvious from the description of elements 8L and 8R respectively of FIGURE 2 hereof. The only difference in the recording system would be the difference in the angle between LV and LR and between RV and RR.

It can be seen that in each system the lens elements of each ocular are substantially coaxial, i.e. within mechanical tolerances, about both an axis of symmetry and a lens optical axis.

Obviously the basic system of FIGURE 2 could be used when the angle between LV and LR and between RV and RR is greater than 20°.

It is here pointed out that the viewer of FIGURE 3 of the present invention could be substituted for the viewer shown in FIGURE 1 of my copending prior application Ser. No. 291,198, filed June 27, 1963 now U.S. Patent 3,358,078. Also the lenses of FIGURES 6 and 7 of said 291,198 (Patent 3,358,078) could be arranged such that central rays 20L and 20R thereof are not parallel to each other but are made to diverge from each other as do LR and RR of FIGURE 2 hereof. If these changes were made the system of said 291,198 (Patent 3,358,078) could be used to create animated cartoons for the present invention.

It is here also pointed out that the basic principle of the present invention, which is the rotation of RR to the right of RV and the rotation of LR to the left of LV, could be used to create the sensation of peripheral vision higher than 220° in the horizontal plane for people who do not wear spectacles. This could be done by constructing the eyepiece lenses (such as 11L and 11R of FIGURE 2 hereof) such that they are small enough and otherwise fitted such that they can be placed extremely close to the eyes (EL and ER respectively) of a viewing observer not wearing spectacles, while at the same time constructing the taking lenses (such as LL and LLR of FIGURE 4 hereof) and recording pick up tubes (such as VL and VR respectively of FIGURE 4 hereof) such that they will record views having angles of view up to 180° or more in both the horizontal and vertical plane with reference to their axes LR and RR respectively (in other words 90° in every direction about LR and RR respectively). It is considered within the spirit and scope of the present invention to provide greater than 220° peripheral vision for the select group of people who do not wear spectacles. However, it is the primary object of applicant to teach a system of wide-angle stereoscopic reproduction which has little or no built in discrimination against any class or group of individuals.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

What I claim is:

1. A wide-angle stereoscopic viewing device for use to re-create substantially distortion-free wide-angle stereoscopic scenes from compressed images having a predetermined amount of fisheye-type, barrel distortion at the ocular object plane with respective right and left picture centers which correspond to the intersection of the axes of symmetry of the fisheye-type compressing taking lenses which introduce the fisheye-type barrel distortion, said axes having a predetermined and operative angle with respect to each other, comprising: a supporting means; right and left wide-angle and expanding ocular lens means for expanding the rays and introducing a predetermined amount of pincushion distortion to nullify the fisheye-type barrel distortion and bring the rays into the eyes of a viewing observer at wide-angles, said ocular lens means having respective axes of symmetry which make an operative angle which is substantially the same said predetermined angle with respect to each other; right and left picture maintaining apparatus for maintaining the right and left fisheye-type, compressed and wide-angle images substantially perpendicular to the respective right and left ocular lens axes with the picture centers of the respective right and left images laterally displaced such as to produce the stereoscopic effect upon a viewing observer.

2. The device of claim 1 wherein said predetermined angle is greater than 3°.

3. A wide-angle stereoscopic recording device comprising: a supporting means; right wide-angle, fisheye-type, compressing taking lens means supported by said supporting means and having a right lens axis of symmetry; left wide-angle, fisheye-type, compressing taking lens means supported by the supporting means and having a left lens axis of symmetry, one said lens axis making a predetermined and operative angle with the other; right and left recording apparatus for maintaining a right image sensitive media at the image plane of the right taking lens such that it is substantially symmetric about and perpendicular to an axis corresponding to the right lens axis and that it receives the fisheye-type, compressed, wide-angle image produced by said right taking lens and for maintaining a left image sensitive media at the image plane of the left taking lens such that it is substantially symmetric about and perpendicular to an axis corresponding to the left lens axis and that it receives the fisheye-type, compressed wide-angle image produced by said left taking lens; and right wide-angle and expanding ocular lens means supported by said supporting means and having a right lens axis of symmetry; left wide-angle and expanding ocular lens means supported by said supporting means and having a left lens axis of symmetry, one said ocular lens axis having substantially the same relation to the other said ocular lens axis as one said taking lens had to the other said taking lens axis; right and left picture apparatus for maintaining and changing the size of the wide-angle, fisheye-type, compressed images produced by the right and left taking lenses whereby said images are maintained substantially perpendicular to the respective right and left ocular lens axes with the respective points corresponding to the intersection of the respective right and left taking lens axes with their respective image planes in substantial registry with the respective right and left ocular lens axis and whereby the respective size is changed such that the barrel distortion of the fisheye-type compressed images substantially nullifies the pincushion distortion introduced by the expanding, wide-angle oculars.

4. A wide-angle and stereoscopic machine comprising a monitoring recorder comprising: a supporting means; right wide-angle taking lens means supported by said supporting means; left wide-angle taking lens means supported by said supporting means and having a lens axis of symmetry in a predetermined angular disposition greater than 3° and a predetermined spatial disposition with reference to the right taking lens axis of symmetry; right recording apparatus for maintaining a right image sensitive media such that the right taking lens focuses its wide-angle image thereupon, the intersection of said right taking lens axis with said right image sensitive media representing a right picture center; left recording apparatus for maintaining a left image sensitive media such that the left taking lens focuses its wide-angle image thereupon, the intersection of said taking lens axis with said right image sensitive media representing a left picture center; right wide-angle ocular lens means having a right ocular lens axis of symmetry and supported by said supporting means; left wide-angle ocular lens means having a left ocular lens axis of symmetry and supported by said supporting means such that said left ocular axis has substantially the same angular relation with said right ocular axis as did said axes of the taking lenses and such that the ocular axes will respectively pass substantially through the center of the eyes of an observer looking into the oculars; right and left image maintaining apparatus for simultaneously reproducing the image focused by the taking lenses upon the respective right and left image sensitive media at each respective object plane of the respective right and left ocular lens means and with the respective right and left picture centers of the reproduced images substantially oriented upon said respective right and left ocular lens axis; means of permanently recording both the right eye wide-angle image and the left eye wide-angle image of each said image sensitive media simultaneously upon a second image sensitive media, coacting with said monitoring recorder; a multiplicity of additional wide-angle stereoscopic monitoring viewing devices coacting with said monitoring recorder, each comprising: an additional supporting means; additional right wide-angle ocular lens means having a right ocular lens axis of symmetry and supported by said additional supporting means; additional left wide-angular ocular lens means having a left ocular lens axis of symmetry and supported by said additional supporting means such that said left ocular axis of said additional left ocular lens has substantially the same angular relation with said right ocular axis of said additional right ocular as did said axes of the taking lenses and such that the ocular axes will respectively pass substantially through the center of the eyes of an observer looking into the oculars; additional right and left image maintaining apparatus for simultaneously reproducing the image focused upon the respective right and left image sensitive media at each respective object plane of the respective right and left ocular lens means and with said respective right and left picture centers substantially oriented upon said respective right and left lens axis of the additional ocular.

5. A wide-angle stereoscopic viewing device for use to re-create wide-angle and stereoscopic scenes from images at the ocular object plane with respective right and left picture centers which correspond to the intersection of the optical axes of the taking lenses with their respective image planes when the taking lens axes make a predetermined angle greater than 3° with respect to each other, there being only one right and only one left picture center since said right and left taking lenses are respectively coaxial, comprising: a supporting means; right wide-angle ocular lens means supported by said supporting means and having each lens element thereof substantially coaxial along only one right optical axis; left wide-angle ocular lens means supported by said supporting means and having each lens element thereof substantially coaxial along only one left optical axis, one said lens axis making a predetermined angle greater than 3° with the other and having an intersection with the other axis behind the viewing device when considered from the orientation of an observer looking into the viewing device; right and left wide-angle picture maintaining apparatus for maintaining the right image substantially perpendicular to the right ocular lens axis and the left image substantially perpendicular to the left ocular lens axis with the optical picture centers of the respective right and left images laterally displaced such as to produce the stereoscopic effect which is the displacement distance substantially orienting them upon the respective ocular lens axes and corresponding to said predetermined angle further apart than the interpupillary distance.

References Cited
UNITED STATES PATENTS

| | | | |
|---|---|---|---|
| 2,223,630 | 12/1940 | Levy | 95—18 |
| 3,045,573 | 7/1962 | Wanner | 95—15 |
| 3,055,265 | 9/1962 | Smith | 95—15 |
| 2,953,980 | 9/1960 | De Montebello | 95—18 |
| 2,955,156 | 10/1960 | Heilig | 178—6.5 |

ROBERT L. GRIFFIN, *Primary Examiner.*

JOHN W. CALDWELL, *Examiner.*

J. A. ORSINO, *Assistant Examiner.*